United States Patent
Kulsangcharoen et al.

(10) Patent No.: US 12,381,032 B2
(45) Date of Patent: Aug. 5, 2025

(54) ZERO-SEQUENCE BLOCKING TRANSFORMER

(71) Applicant: Hamilton Sundstrand Corporation, Charlotte, NC (US)

(72) Inventors: Ponggorn Kulsangcharoen, Solihull (GB); Rodrigo Fernandez-Mattos, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 400 days.

(21) Appl. No.: 17/944,327

(22) Filed: Sep. 14, 2022

(65) Prior Publication Data

US 2023/0085386 A1 Mar. 16, 2023

(30) Foreign Application Priority Data

Sep. 14, 2021 (EP) .................... 21196711

(51) Int. Cl.
  *H01F 27/30* (2006.01)
  *H01F 27/26* (2006.01)
  *H02M 7/08* (2006.01)

(52) U.S. Cl.
  CPC ......... *H01F 27/306* (2013.01); *H01F 27/263* (2013.01); *H02M 7/08* (2013.01)

(58) Field of Classification Search
  CPC ........ H01F 27/346; H01F 27/26; H01F 27/28; H01F 27/306; H01F 3/12; H01F 3/14; H01F 30/12; H01F 30/16; H01F 30/02; H02M 7/068; H02M 7/08; H02M 1/0064; H02M 1/12; H02M 5/10
  See application file for complete search history.

(56) References Cited

U.S. PATENT DOCUMENTS

| | | | |
|---|---|---|---|
| 5,446,643 A | 8/1995 | McMurray | |
| 5,726,611 A * | 3/1998 | Takagi | H01F 17/06 336/224 |
| 5,903,066 A | 5/1999 | Enjeti et al. | |
| 6,101,113 A | 8/2000 | Paice | |
| 6,982,884 B1 | 1/2006 | Paice | |
| 7,233,506 B1 | 6/2007 | Paice | |
| 9,054,599 B2 * | 6/2015 | Wei | H02M 7/493 |
| 9,478,353 B2 | 10/2016 | Xu et al. | |
| 10,049,811 B2 | 8/2018 | Huang et al. | |

(Continued)

FOREIGN PATENT DOCUMENTS

| | | | | |
|---|---|---|---|---|
| DE | 102010050828 A1 * | 3/2012 | ............ | H01F 17/06 |
| DE | 102017214857 A1 * | 2/2019 | ........... | H01F 17/062 |

(Continued)

OTHER PUBLICATIONS

English Translation of DE 10 2010 050 828 (Year: 2010).*

(Continued)

*Primary Examiner* — Sean Kayes
*Assistant Examiner* — Nusrat Quddus
(74) *Attorney, Agent, or Firm* — CANTOR COLBURN LLP

(57) ABSTRACT

A zero-sequence blocking transformer includes a first core part, a first pair of windings wound around the first core part, a second core part and a second pair of windings wound around the second core part, the first core and the second core having a geometry to generate a leakage inductance.

4 Claims, 5 Drawing Sheets

Proposed 12-pulse enhanced IMC-ZSBT with EE core

(56) References Cited

U.S. PATENT DOCUMENTS

| | | | |
|---|---|---|---|
| 10,199,161 B2 | 2/2019 | Valdivia-Guerrero et al. | |
| 11,621,123 B2* | 4/2023 | Lu | H01F 27/38 336/170 |
| 12,132,400 B2* | 10/2024 | Lin | H02M 7/53871 |
| 2004/0257187 A1* | 12/2004 | Drummond | H01F 30/06 336/61 |
| 2009/0108977 A1* | 4/2009 | Chen | H01F 27/346 336/198 |
| 2014/0049351 A1* | 2/2014 | Carsten | H01F 27/25 336/213 |
| 2014/0125430 A1* | 5/2014 | Ichihara | H01F 27/38 333/185 |
| 2014/0176289 A1* | 6/2014 | Won | H03H 7/427 336/215 |
| 2014/0306788 A1* | 10/2014 | Umetani | H01F 27/385 336/173 |
| 2015/0042437 A1* | 2/2015 | White | H01F 27/325 336/196 |
| 2018/0286577 A1* | 10/2018 | Renteria | H01F 27/2823 |
| 2019/0066903 A1* | 2/2019 | Daily | H01F 30/16 |
| 2020/0234867 A1* | 7/2020 | Njiende | H01F 3/14 |
| 2020/0373849 A1 | 11/2020 | Lai et al. | |
| 2021/0280367 A1* | 9/2021 | Kulsangcharoen | H01F 30/16 |
| 2022/0199302 A1* | 6/2022 | Beddingfield | H01F 27/38 |
| 2023/0260691 A1* | 8/2023 | Fukuda | H01F 27/2823 336/221 |
| 2024/0013966 A1* | 1/2024 | Zhao | H01F 27/28 |
| 2024/0177916 A1* | 5/2024 | Jung | H01F 27/2804 |
| 2024/0379275 A1* | 11/2024 | Soni | H01F 30/16 |

FOREIGN PATENT DOCUMENTS

| | | | | |
|---|---|---|---|---|
| EP | 3493351 A1 | 6/2019 | | |
| EP | 3876249 A1 | 9/2021 | | |
| EP | 4203293 A1 * | 6/2023 | | H02M 1/126 |

OTHER PUBLICATIONS

English Translation of DE 2017 214 857 (Year: 2017).*
European Search Report for Application No. 21196711.2, mailed Mar. 16, 2022, 19 pages.
Yao, et al. "Zero Sequence Blocking Transformers for multi-Pulse Rectifier in Aerospace Applications" 2014 IEEE Energy Conversion Congress and Exposition (ECCE), IEEE, Sep. 14, 2014, pp. 999-1006.

* cited by examiner

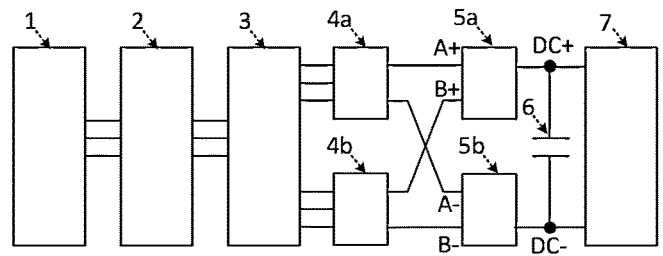
Figure 1: 12-pulse ATRU with IPT architecture
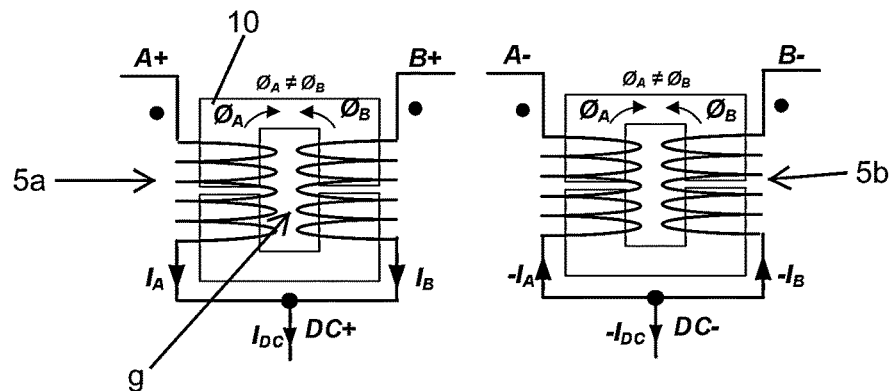
Figure 2: IPT for 12-pulse ATRU
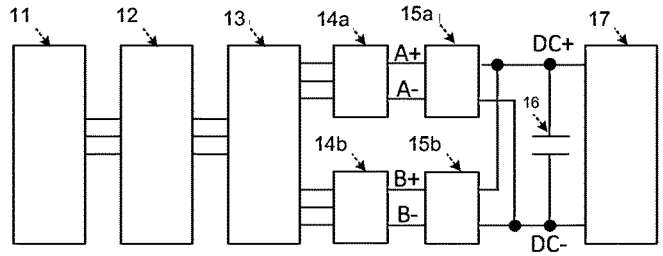
Figure 3: 12-pulse ATRU with ZSBT architecture
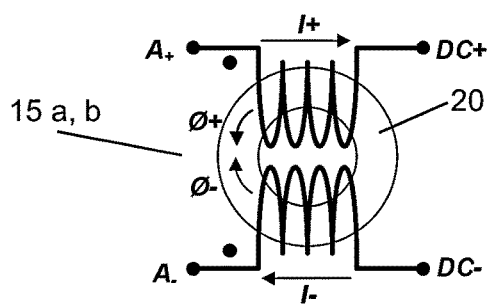
Figure 4A
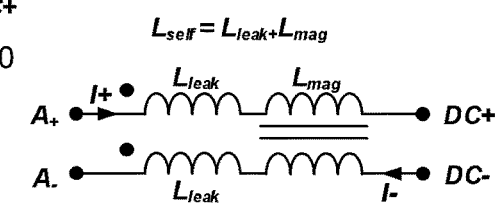
Figure 4B
Traditional ZSBT and its equivalent circuit

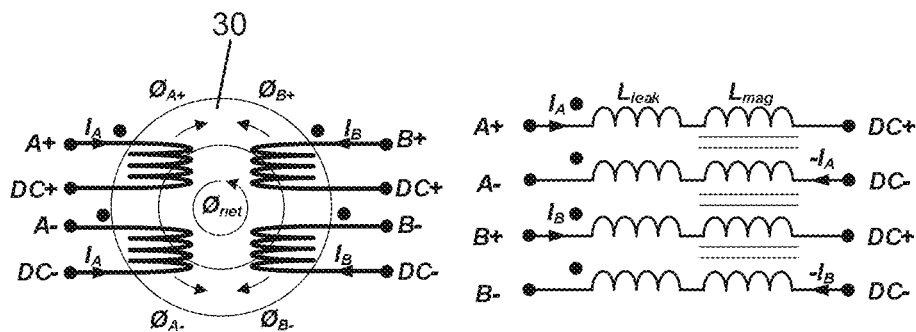
Figure 5: Proposed 12-pulse IMC-ZSBT
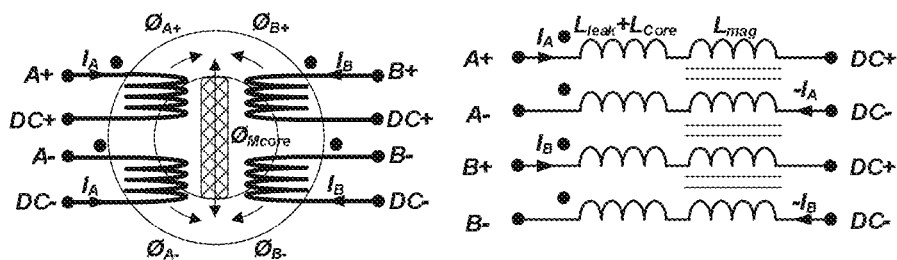
Figure 6: Proposed 12-pulse enhanced IMC-ZSBT with toriodal core
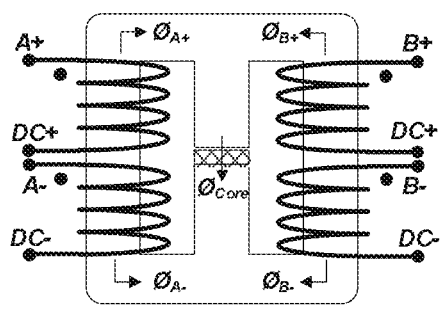
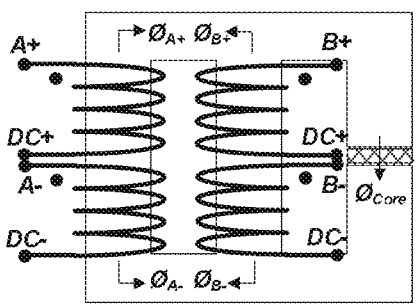
Figure 7A  Figure 7B
Proposed 12-pulse enhanced IMC-ZSBT with EE core

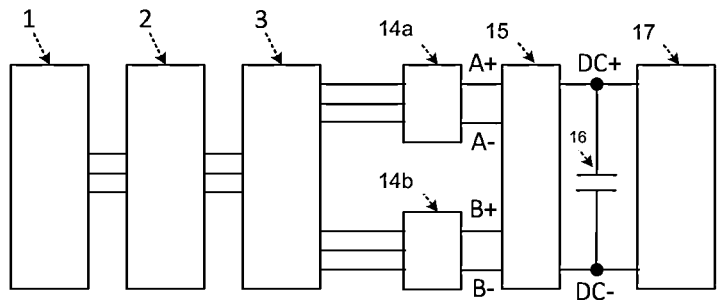
Figure 8: 12-pulse ATRU with 12-pulse IMC-ZSBT
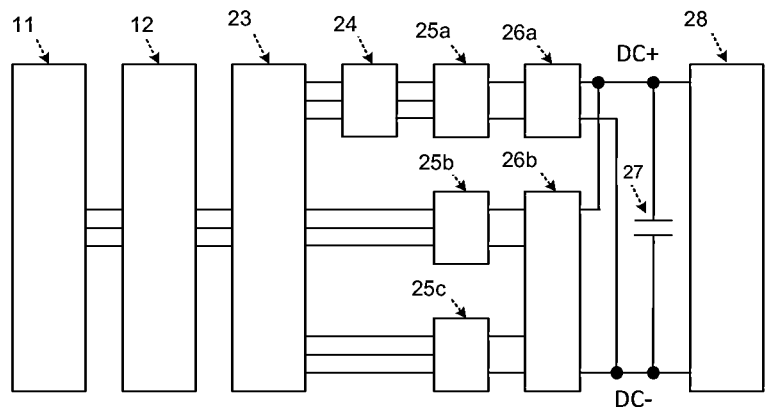
Figure 9: Proposed 18-pulse ATRU with ZSBT and 12-pulse IMC-ZSBT
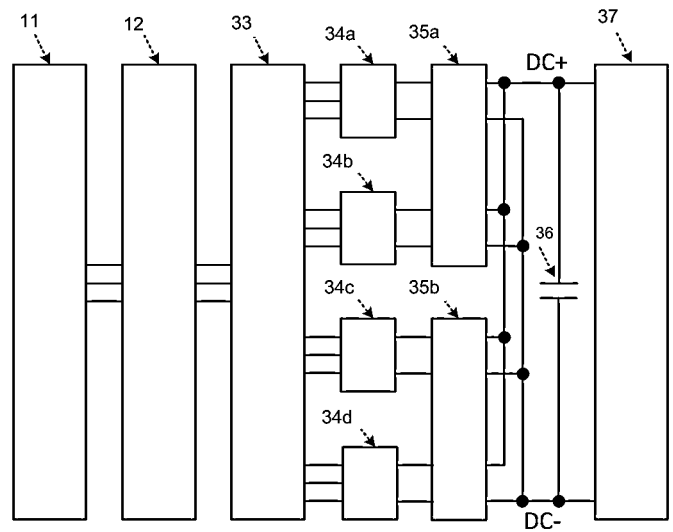
Figure 10

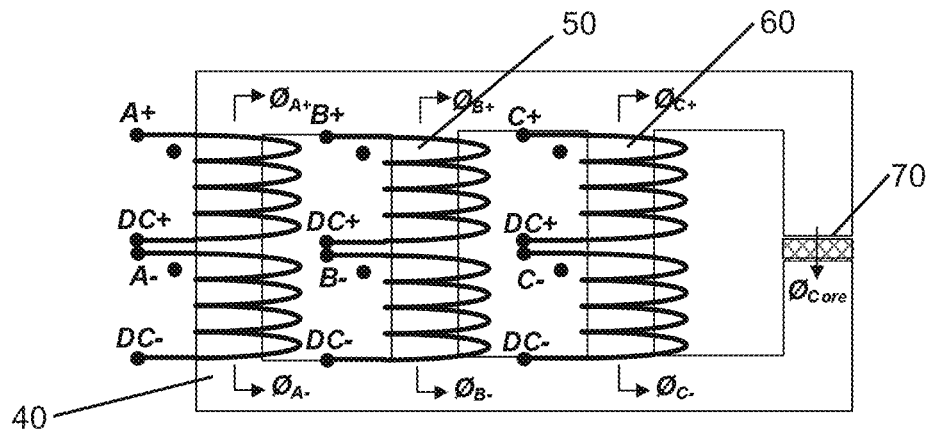
Figure 11: Proposed enhanced 18-pulse asymmetrical structure IMC-ZSBT
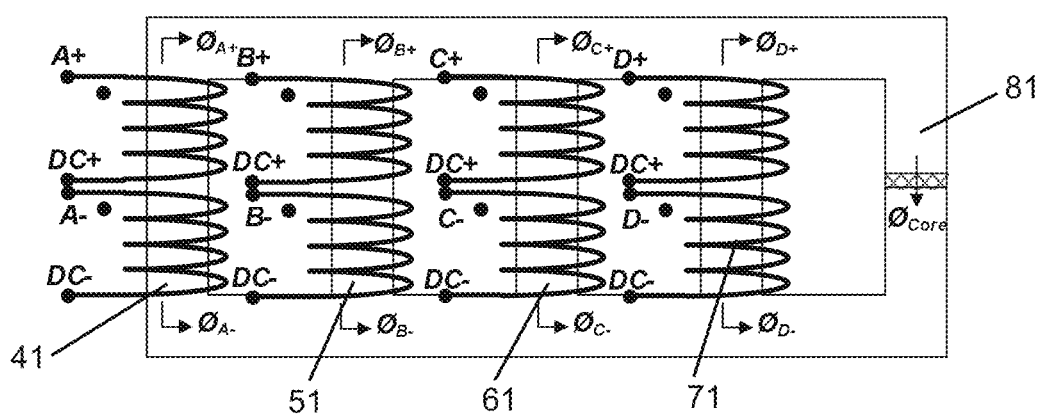
Figure 12: Proposed enhanced 24-pulse asymmetrical structure IMC-ZSBT

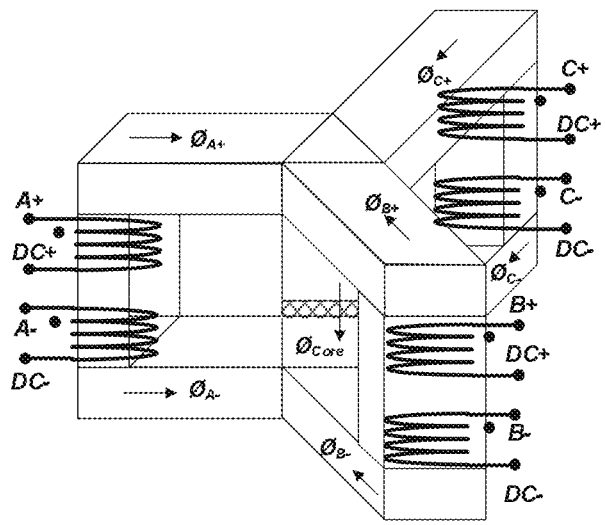
Figure 13: Proposed enhanced 18-pulse symmetrical structure IMC-ZSBT
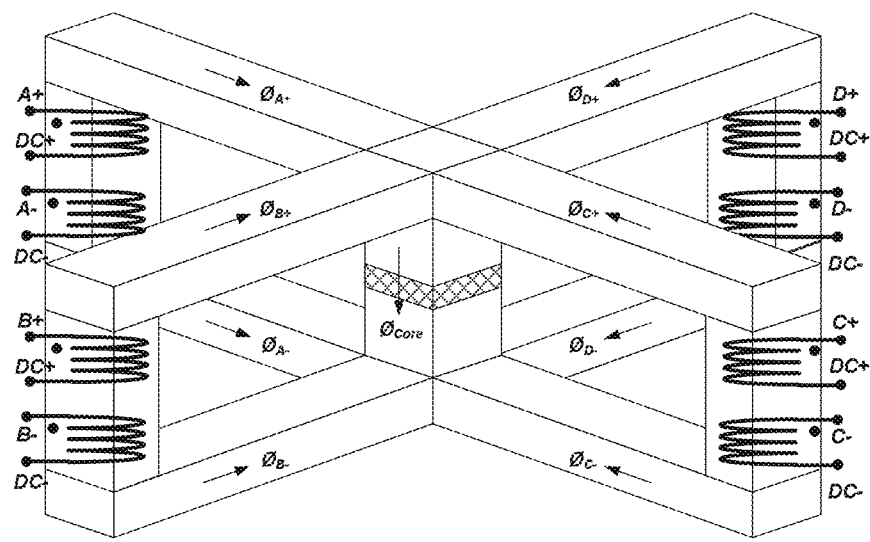
Figure 14: Proposed enhanced 24-pulse symmetrical structure IMC-ZSBT

ZERO-SEQUENCE BLOCKING TRANSFORMER

CROSS-REFERENCE TO RELATED APPLICATIONS

This application claims priority to European Patent Application No. 21196711.2 filed Sep. 14, 2021, the entire contents of which is incorporated herein by reference.

TECHNICAL FIELD

The present disclosure concerns designs for zero-sequence blocking transformers (ZSBTs) in auto-transformer rectifier units (ATRUs).

BACKGROUND

ATRUs are commonly used in medium to high power AC/DC power converters such as in aerospace applications. Conventional ATRUs include a three-phase supply, an input filter, an auto-transformer unit (ATU), diode bridge rectifiers for the ATU outputs and a DC link capacitor to provide DC output to the load to be driven. Such systems commonly use a 12-pulse ATU although ATUs with different numbers of pulses (e.g., but not only other multiples of six such as 18, 24 etc.) can also be used.

Because such ATRUs can suffer from a net imbalance of flux due to zero-sequence currents circulating between the outputs of the diode bridge rectifiers, the zero-sequence currents should be reduced. Zero-sequence components are components that are at any one time equal in different phases of the system and thus give rise to undesirable harmonic content.

One way of reducing the effects of zero-sequence currents uses inter-phase transformers (IPTs) as these have a relatively simple design and provide relatively good system performance.

Alternatively, zero-sequence blocking transformers (ZSBTs) are commonly used in multi-phase systems having several converters connected in parallel, such as auto-transformer rectifier units (ATRUs), to minimize or block zero-sequence components in the output signals due to the parallel windings and to minimize zero-sequence current circulating between the diode bridges and to block zero-sequence current on the DC side. Minimizing circulating zero-sequence current also results in reduced DC-link ripple current. ZSBTs are designed to present a high impedance between parallel outputs to block zero-sequence components, to remove triplen (3rd, 6th, 9th etc) order harmonics.

The ZSBT is commonly located in an ATRU between the diode bridge rectifiers and the common DC-link capacitor.

A ZSBT presents a leakage inductance which is a function of the leakage flux that does not flow from the primary to the secondary winding of the ZSBT. It is desirable to increase ZSBT leakage inductance as this improves the effect of reducing output current ripple from the diode bridge rectifier as well as improving overall ATRU input current power quality.

ZSBTs have a construction similar to common-mode chokes in EMI filters and are typically designed as two windings on a toroidal core so as to cancel out the main magnetic flux generated by the currents.

Both the IPT and the ZSBT designs rely on their high self-inductance to limit the zero-sequence current circulating between two rectifier bridges. The also rely on the leakage inductance, which is part of the self-inductance, to block the zero-sequence current to the output DC link capacitor.

In conventional ZSBT designs, the magnetic core geometry and winding scheme are selected to provide a given leakage inductance. Each ZSBT, therefore, will have a set leakage inductance, determined by its core geometry and winding arrangement.

If the core of the ZSBT is made of a high permeability material (e.g. amorphous material, nanocrystalline material etc.), the required properties can be achieved with a relatively small number of winding turns and a relatively small core size. It is, however, often desirable to use a core material that has a lower permeability e.g. silicon iron, ferrite etc.) because of its lower cost and better ability to provide complex geometries. With such core materials, however, to achieve the required self-inductance, a large number of turns and large core size are required. This results in a large, bulky structure.

There is, therefore, a need for improved ZSBT designs, employing specific winding arrangements on a magnetic core to result in a smaller ZSBT unit than provided by the conventional individual ZSBT arrangements. There is a need for an arrangement with fewer magnetic components and a lighter, more compact overall system.

SUMMARY

According to the disclosure, there is provided a zero-sequence blocking transformer comprising a first core part, a first pair of windings wound around the first core part, a second core part and a second pair of windings wound around the second core part, the first core and the second core having a geometry to generate a leakage inductance.

In some examples, an additional leakage flux component part is added. In the case of a known toroidal core, the additional component part may be a rod of magnetic material fitted into the gap between the windings to intentionally create an additional leakage flux path. Alternatively, an EE core geometry can be used and the additional leakage flux path is created by forming an air gap or adding a magnetic material insert in the leg which does not carry a winding.

BRIEF DESCRIPTION OF THE DRAWINGS

FIG. 1 is a schematic circuit view of a 12-pulse ATRU with IPT architecture.

FIG. 2 shows the structures of the IPTs of FIG. 1.

FIG. 3 is a schematic circuit for a 12-pulse ATRU with ZSBT.

FIG. 4A shows an example of a toroidal core used in a known ZSBT.

FIG. 4B is the equivalent circuit of the core of FIG. 4A.

FIG. 5 shows an example of a toroidal core modified according to this disclosure and its equivalent circuit.

FIG. 6 shows an example of a further modified toroidal core for a 12-pulse ATRU according to this disclosure, and its equivalent circuit.

FIGS. 7A and 7B show alternative examples of an EE core modified according to this disclosure.

FIG. 8 is a schematic circuit for a 12-pulse ATRU according to the disclosure.

FIG. 9 is a schematic circuit for an 18-pulse ATRU according to the disclosure.

FIG. 10 is a schematic circuit for a 24-pulse ATRU according to the disclosure.

FIG. 11 shows an example of a core for ZSBT in an 18-pulse ATRU modified according to this disclosure.

FIG. 12 shows an example of a core for ZSBT in a 24-pulse ATRU modified according to this disclosure.

FIG. 13 shows an example of an alternative core structure for ZSBT in an 18-pulse ATRU modified according to this disclosure.

FIG. 14 shows an example of an alternative core structure for ZSBT in a 24-pulse ATRU modified according to this disclosure.

DETAILED DESCRIPTION

The described embodiments are by way of example only. The scope of this disclosure is limited only by the claims.

The use of IPTs and ZSBTs in ATRUs will be briefly described for background, with reference to FIGS. 1 to 4.

ATRUs are commonly used in medium to high power AC-DC power conversion systems used in e.g. aerospace applications. FIGS. 1 and 3 show examples of 12-pulse ATRUs. Other winding schemes and topologies are also known, e.g. 18-pulse, 24-pulse.

As described above, to improve performance of the ATRU, IPTs or ZSBTs are connected between the outputs of the diode bridge rectifiers and the DC-link capacitor.

FIG. 1 shows a 12-pulse ATRU having a three-phase supply 1, an input filter 2, a 12-pulse ATU 3, two diode bridge rectifiers 4a and 4b, DC-link capacitor 6, load 7 and IPTs 5a and 5b between the rectifiers and the DC-link capacitor. For a 12-pulse ATRU three phases are input to the ATRU which provides six outputs so two rectifier bridges are needed. An IPT is provided for each rectifier—i.e. for the six outputs of the 12-pulse ATRU, two IPTs are required.

As seen in FIG. 2, the IPT has two windings A+, B+; A−, B−, wound on a magnetic core 10 with a small air gap g. The small air gap prevents the core being saturated from the net flux imbalance generated by the zero-sequence currents circulating between the outputs of the two diode bridges.

As an alternative to IPTs, the zero-sequence currents can be cancelled by zero-sequence blocking transformers as mentioned above.

FIG. 3 shows a 12-pulse ATRU with ZBSTs. The ATRU has a three-phase supply 11, an input filter 12, a 12-pulse ATU 13, two diode bridge rectifiers 14a and 14b, DC-link capacitor 16, load 17 and ZSBTs 15a and 15b between the rectifiers and the DC-link capacitor.

As seen in FIG. 4A, the ZSBT has two windings A+, A−, wound on a toroidal core 20. The main magnetic fluxes generated by the positive and negative currents are usually equal and cancel each other out. This is seen in the equivalent circuit of FIG. 4B. ZSBTs have leakage inductances Lleak and magnetizing inductances Lmag as shown in the equivalent circuit in FIG. 4B. Only the leakage inductance is important in limiting zero-sequence currents between the outputs of the diode bridges as well as minimizing the output ripple currents.

For both of the above mentioned solutions, for a 12-pulse ATRU, two IPT or ZSBT units (5a, 5b; 15a, 15b) are required. The same principle applies for higher pulse ATRUs—two IPT or ZSBT units are required for each multiple of 12 pulses. For an 18-pulse ATRU, two IPTs or three ZSBTs would be required, for a 24-pulse ATRU, four ZSBTs would be required etc.

As mentioned above, each of these units can, particularly for low permeability core materials, become large, bulky and heavy due to the number of turns of the windings and the size of the core required to achieve the necessary self-inductance to limit the zero-sequence currents.

The aim of the present disclosure is to reduce the overall size of the ZSBT solution for 12-pulse ATRUs or higher.

The solution according to tis disclosure is an integrated magnetic core ZSBT design in which, for a 12-pulse ATRU, the four coils of the ZSBT are wound onto a single core rather than two separate cores as in the conventional designs. This means that for a 12-pulse ATRU, only one ZSBT unit is required to cancel the zero-sequence currents of two rectifiers. For ATRUs with higher numbers of pulses, for each set of twelve pulses, a single ZSBT unit is required, rather than two. Therefore, for a 24-pulse ATRU, only two ZSBT cores are required instead of four. For an 18-pulse ATRU, two ZSBT cores are provided instead of three (one, instead of two, for 12 outputs and another for the other six outputs).

FIG. 5 shows a ZSBT design according to the disclosure for a 12-pulse ATRU. Here, four windings A+, A−, B+, B−, are provided on a single core 30. The windings are arranged as shown such that the flux produced by the + and − current winding pairs is cancelled out—i.e. ΦA+=ΦA− and ΦB+=ΦB− and only the net flux Φnet is left circulating inside the core. The net flux is produced by the zero-sequence current. No additional external power is required for the system to function properly.

The same concept can apply to an E-core design, whereby two coils are provided on each leg of the core (not shown in its simplest form, but shown with a further modification as described below).

If it is necessary or desired to further increase or control the leakage inductance of the ZSBT, the design can be further modified using the concepts described in European patent application EP-A-3876249, by inserting an additional inductance path. The leakage inductance of a ZSBT is a product of that leakage flux that does not flow from one winding to another—here, the net flux not flowing from windings A to windings B. B inserting a magnetic rod across a toroidal core (as shown in FIG. 6) or adding an extra leg to an E-core as shown in FIGS. 7A and 7B, flux can be diverted from the main path as leakage flux allowing the leakage inductance to be controlled.

By providing four windings on a common coil, according to this disclosure, the number of ZSBT units required in an ATRU can be reduced. This can be seen for different ATRUs with toroidal cores with reference to FIGS. 8 to 10.

For a 12-pulse ATRU (FIG. 8) it can be seen that, compared to FIG. 3, only one ZBST 15 unit is required instead of two (15a, 15b in FIG. 3). The other parts of the system are the same as in FIG. 3 and the same reference numerals are used for those parts.

FIG. 9 shows the solution for an 18-pulse ATRU which, again has a three-phase supply 11, input filter 12 and, here, an 18-pulse ATRU 23. A balancing resistor 24 is provided and three diode bridge rectifiers 25a, 25b and 25c, a DC capacitor 27 and load 28. Conventionally, for three diode bridge rectifiers, three ZSBT units would be required. With the modification of this disclosure, only two units 26a, 26b are required.

FIG. 10 shows the solution for a 24-pulse ATRU which, again has a three-phase supply 11, input filter 12 and, here, a 24-pulse ATRU 33. Here, the system requires four diode bridge rectifiers 34a, 34b, 34c and 34d, a DC capacitor 36 and load 37. Conventionally, for four diode bridge rectifiers, four ZSBT units would be required. With the modification of this disclosure, only two units 35a and 35b are required.

The principle can be applied for any greater number of pulse ATRUs. For any even number of diode bridges (12-pulse, 24-pulse, 36 pulse etc.) the number of ZSBTs is, therefore halved. For odd numbers of diode bridges, the number of ZSBTs is also reduced in that for each pair of bridges, only one ZSBT is needed instead of one.

FIGS. 11 to 14 show possible monolithic core designs using the above concept and, as a preferred feature to add further leakage inductance control, with an additional leakage path. For E-core designs, all of the windings for the ZSBT can be provided onto a single unit in having one core leg for each pair of windings and, if preferred, the additional flux path. Therefore, regardless of the number of pulses and, hence, diode bridges, the ZSBT solution can be provided as a single unit, with one core leg for each pair of coils—i.e. one core leg for each six pulses.

FIG. 11 shows a core design for an 18-pulse ATRU which two windings A+, A−; B+, B−, C+, C− on each core leg 40, 50, 60 and with the additional inductance path 70.

FIG. 12 shows the corresponding design for a 24-pulse ATRU with coil pairs A+, A−; B+, B−; C+, C−; D+, D− on legs 41, 51, 61, 71 and the extra path 81.

Alternatively, the cores can be designed with a symmetrical structure as shown in FIGS. 13 and 14, with the core legs, each having a pair of windings, extending from a central point, and at equal angles from each other, with the additional inductance path, if required, at the central point. For an 18-pulse ATRU, for example, as shown in FIG. 13, three legs are spaced 120 degrees apart. For a 24-pulse ATRU, four legs are spaced 90 degrees apart.

The ZSBT designs according to this disclosure provide a simpler, smaller and lighter zero-sequencing current solution to ATRUs of any size.

The invention claimed is:

1. A zero-sequence blocking transformer comprising:
   a single core defining a closed magnetic path around which at least six windings are wound, the single core having:
   a first core part;
   a first pair of the four windings wound around the first core part;
   a second core part;
   a second pair of the four windings wound around the second core part, the first core and the second core;
   a third core part;
   a third pair of windings wound around the third core part;
   wherein the first, second and third core parts combine to form the single core; and
   wherein the single core further include leakage core part connected in parallel with the first, second and third core parts and around which no windings are wound.

2. A zero-sequence blocking transformer as claimed in claim 1, wherein the first core part, the second core part and the third core part are first, second and third legs of an EE core geometry.

3. A zero-sequence blocking transformer as claimed in claim 1, further comprising a fourth core part as a fourth leg of the transformer, and a fourth pair of windings formed on the fourth leg.

4. A multi-phase auto-transformer rectifier unit comprising:
   a plurality of diode bridge rectifiers connected in parallel;
   a DC-link capacitor between the rectifiers and a load to be driven, in use, by the unit; and
   a zero-sequence blocking transformer as claimed in claim 1 between the rectifiers and the DC-link capacitor.

* * * * *